United States Patent [19]

Nishibori

[11] Patent Number: 4,610,900

[45] Date of Patent: Sep. 9, 1986

[54] WOOD-LIKE MOLDED PRODUCT OF SYNTHETIC RESIN

[76] Inventor: Sadao Nishibori, 1-9-206, Higashi-shinagawa, 1-chome, Shinagawa-ku, Tokyo, Japan

[21] Appl. No.: 683,641

[22] Filed: Dec. 19, 1984

[51] Int. Cl.[4] .......................... B32B 27/04; B32B 3/30

[52] U.S. Cl. ...................................... 428/15; 156/62.2; 156/209; 156/268; 264/118; 264/119; 264/162; 428/151; 428/156; 428/167; 428/326

[58] Field of Search ............... 428/151, 156, 167, 326, 428/15; 156/62.2, 209, 268; 264/162, 118, 119

[56] References Cited

U.S. PATENT DOCUMENTS

| | | | |
|---|---|---|---|
| 3,309,444 | 3/1967 | Schueller | 428/326 |
| 3,511,744 | 5/1970 | Garrett, Jr. | 428/155 |
| 3,536,574 | 10/1970 | Buckley | 428/151 |
| 3,873,662 | 3/1975 | Cartlidge | 264/162 |
| 4,064,301 | 12/1977 | Howard | 428/151 |
| 4,104,429 | 8/1978 | Colledge | 428/151 |

*Primary Examiner*—Paul J. Thibodeau
*Attorney, Agent, or Firm*—Holman & Stern

[57] ABSTRACT

The present invention relates to wood-like molded products of synthetic resin which are manufactured by mixing a synthetic resin material with a fine aggregate of cellulose base such as wood meal, chaffs, begasse and in which the internal residual stress which may cause deformation (for example, warping and twisting) of the products at the time or after molding is eliminated in advance to prevent chronological deformation. More particularly, it relates to a method of eliminating said residual stress by subjecting the molded products containing cellulose-base aggregate, especially the resinous skin layer thereof, to re-heating, curing and sanding or jetting treatments (sand blasting, shot peening, grit blasting) under predetermined conditions.

6 Claims, 8 Drawing Figures

WOOD-LIKE MOLDED PRODUCT OF SYNTHETIC RESIN

DETAILED DESCRIPTION OF THE INVENTION

(Prior Art)

Molded products of synthetic resin are generally inconsistent in the structural density because of the materials used and the molding conditions and contain internal residual stress depending on the molding conditions. The internal residual stress is responsible for shrinkage in products when cooled after molding as well as shrinkage with time, expansion/contraction due to temperature changes. This leads to warping and twisting of the products.

Attempts have been made to mix various types of aggregate into a resin material to prevent warping and twisting in molded products, achieving reasonably satisfactory results depending on the use of the products. However, an addition of aggregates is not effective enough to obviate deformation of products caused by contraction peculiar to resinous substances and the problems of warping and twisting often occur.

(Problems to be Solved)

In the present invention, a large amount of a cellulosebase aggregate is added to a resin material to be molded with an intention to prevent deformation such as seen in the prior art and to remove residual internal stress in the products.

When a large amount of cellulose aggregate is added to a resin material, it hampers the flowability of the resin to a greater extent and produces internal residual stress of unexpectedly large degree in the resin product to be molded.

Such internal residual stress, if left as it is, will cause deformation in the molded product in the direction of the stress, posing various disadvantages in use.

Such residual internal stress is caused by uneven flow of the resin material due to decreased fluidity caused by the addition of cellulose aggregate. Since the direction of such residual stress is not always the same, there arise still more disadvantages.

The problem of such a residual internal stress becomes more marked when the resin product is subjected to secondary processing; particularly, when the product is reprocessed by hot pressing, etc., warping and twisting are likely to occur to an extent greater than anticipated.

Wood-like molded products of synthetic resin according to the present invention are characterized in that residual stress in such resin products, especially those containing a large amount of cellulose aggregate, has been eliminated so that the products may be used with and/or without further processings.

(Means to Solve the Problems)

In order to eliminate the residual internal stress in the molded resin product according to the present invention, a resin material, especially a thermo-plastic resin containing a neutralized cellulose-base aggregate, is first heated and cooled, and the resultant resin product is then subjected to sanding or jetting treatment on its hardened layer formed on the surface.

As a result, the wood-like molded product of synthetic resin can be used as it is, as well as after further processing for embossing by hot pressing, without causing warping or twisting.

Figure 1:
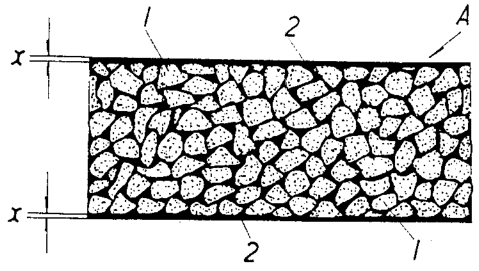
Figure 2:
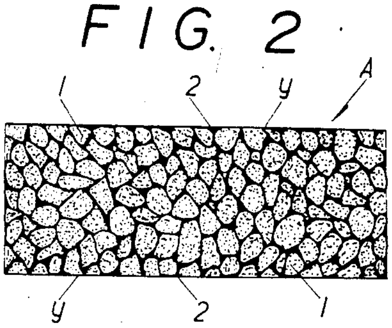
Figure 3:
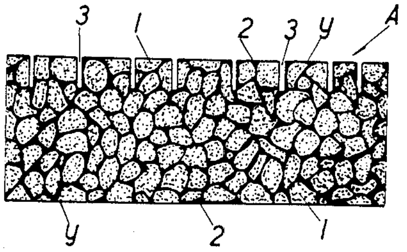
Figure 4:
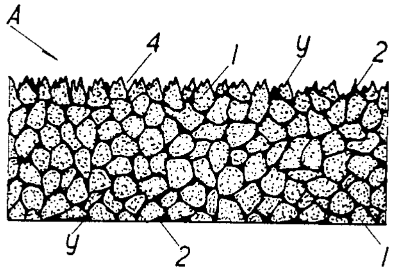
Figure 5:
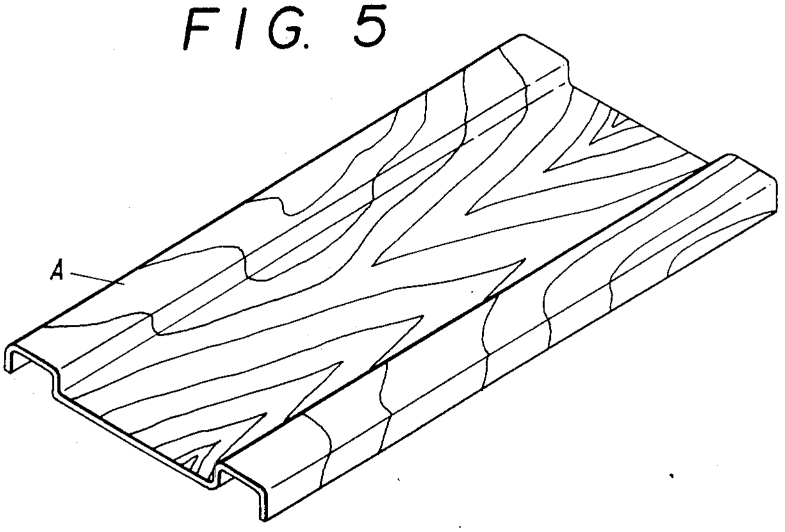
Figure 6:
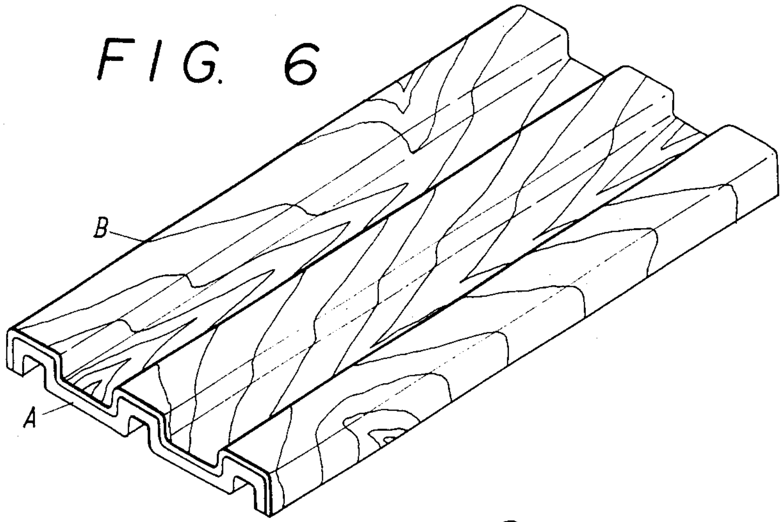
Figure 7:
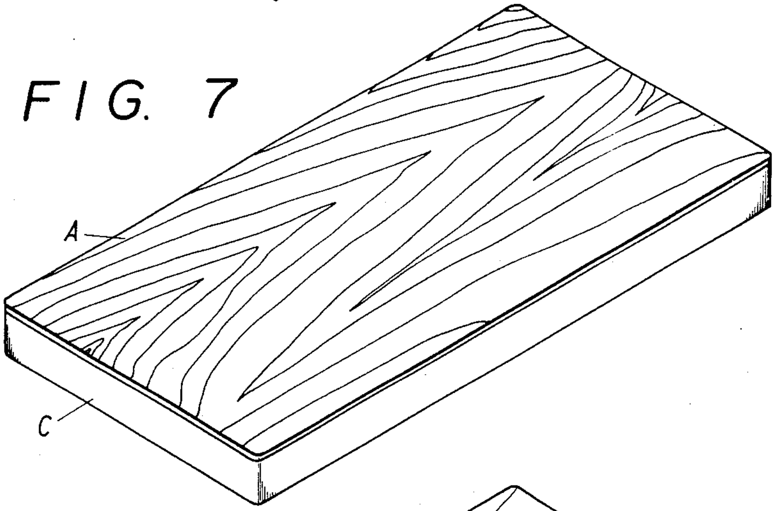
Figure 8:
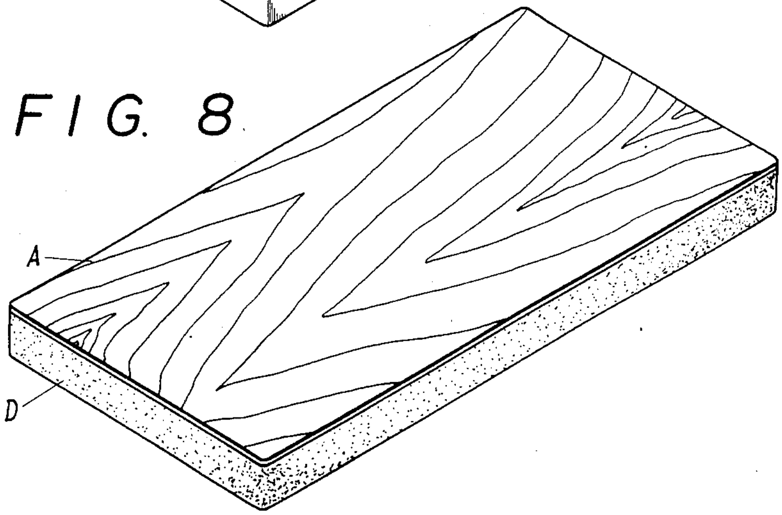

The wood-like molded product of synthetic resin according to the present invention will now be described in more detail referring to the accompanying drawings. FIG. 1 is a cross section of the molded resin product containing a cellulose-base aggregate. FIG. 2 is a cross section of the product after the surface layers X in FIG. 1 are removed by sanding or jetting. FIG. 3 is a cross section of the resin product provided with grooves 3 to block the internal residual stress. FIG. 4 is a cross section of the resin product having a rugged surface 4 produced by sanding or jetting. FIG. 5 is a perspective view of the resin product A having an embossed surface. FIG. 6 is a perspective view of the resin product A coated with a facing material B. FIG. 7 is a perspective view of a plywood C coated with the resin product A. FIG. 8 is a perspective view of a foamed synthetic resin material D coated with the resin product A of soft type.

PREFERRED EMBODIMENT OF THE INVENTION

The present invention will now be described referring to a typical embodiment.

An aggregate 1 to be mixed with a raw material synthetic resin 2 is prepared by pulverizing wood chips, pulps, chaffs or bagasses into particles of 80–200 mesh, ideally 150 mesh or finer. Ther water content of the aggregate is reduced to less than 5 o/wt, and preferably less than 3 o/wt by drying when mixed into the material 2.

The synthetic resin material 2 to be used may be selected from any thermoplastic resins such as vinyl chloride, ABS resin, and polycarbonate resin depending on the use and the shape of the final product to be manufactured.

The mixing ratio of the resin material 2 and the aggregate 1 also depends on the molding method and the nature of the product to be molded. For example, the mixing ratio of the aggregate 1 is selected from within the ranges below:

Injection molded product: 15–50 o/wt
Extrusion molded product: 15–80 o/wt
Rolled Product: 10–90 o/wt
Film (rolled) product: 5–40 o/wt As in the conventional resin molding, plasticizer, stabilizer, filler, additive, dye, pigment, lubricant, parting agent, etc. may be added to the resin material 2 to suit the intended purpose.

A plasticizer is particularly important in obtaining resin products of soft sheet or film. Dioctyl phthalate and tricresyl phosphate are employed for vinyl chloride. Tribasic and dibasic lead strearates are used as a stabilizer, carbon black and calcium carbonates as a filler, paraphin and waxes as a lubricant and silicone oil and silicone baked varnish as a parting agent.

Another example of the aggregate 1 will be described with regard to the method for neutralizing the wood vinegar contained in the aggregate 1. The cellulose base aggregate contains wood vinegar, and the wood vinegar generates gas (mainly acetic acid gas) when heated. Thus, if the aggregate 1 is heat-molded together with the thermoplastic resin 2 without neutralizing the wood vinegar contained in the aggregate 1, the wood vinegar gas is produced inside the molding machine to corrode the internal wall of the machine.

In an open-type molding machine such as for roll molding, press molding and vacuum molding, a resin containing an aggregate 1 of the average particle diameter of 150 mesh and dryness of 3 o/wt can be molded. On the other hand, it becomes essential to remove the wood vinegar from the aggregate 1 when molding is conducted using a closed type cylinder and dies such as in the injection and extrusion moldings.

Methods for neutralizing the wood vinegar in the aggregate 1 will now be explained. In the first method, the water content of the cellulose-base aggregate such as wood chips, pulps, bagasses and chaffs is maintained within the air dried ratio to render the material brittle in structure. A urea type resin solution is added and impregnated in the structure before heating, drying and pulverizing the aggregate at a temperature ranging between 100° and 200° C.

Addition/impregnation of the urea resin solution and heating/pulverization allow neutralization of the wood vinegar in the material and eliminate any possibility of wood vinegar gas generation during the subsequent molding steps. Addition/impregnation/hardening/pulverization of the urea resin solution also produce an aggregate 1 of discrete containing the hardened resin, and the aggregate thus formed will eliminate the disadvantages caused by re-absorption of moisture by the cellulose raw material. At the same time, the aggregate 1 will be imparted with a suitable smoothness.

In another method of preparing the aggregate 1, a treating solution which absorbs/exhausts, as the temperature changes, acidic gas such as monoethanol amine, triethanol amine, etc. is applied to the cellulose material which is subjected to heating and pulverization to obtain neutralized fine aggregate.

Different methods for forming the resin product of the present invention using different resin materials 2 and aggregates 1 will be described in detail.

In one method, a thermo-plastic resin material 2 mixed with a not neutralized aggregate is charged into a kneader or Banbury mixer for heating and kneading. The kneaded product thus obtained is then used as the raw material for conventional extrusion or injection molding. In another method, a thermo-plastic resin material 2 added with a not neutralized aggregate 1 and a urea base resin material (or treating solution such as monoethanol amine, triethanol amine) is charged into a kneader or Banbury mixer for heating and kneading. The kneaded product thus obtained is used as the raw material for conventional extrusion or injection molding. In still another method, a neutralized aggregate 1 is directly mixed with a thermoplastic resin material 2 to be used as the raw material for conventional extrusion or injection molding.

The synthetic resin products formed by the methods mentioned above are less likely to be deformed by contraction for resin material containing a cellulose aggregate 1, and moreover, are superior in impact resistance and have adequate hardness. The synthetic resin products may be molded into a sheet, rod, box and the like to be used as the material for buildings such as floor, wall and ceiling, for furniture such as desk and cabinet, and for the interior of automobiles.

The synthetic resin material thus formed is then subjected to heating and curing, which can be done in the following three typical manners.

According to one such method, heating is conducted at a temperature ranging between 140° and 300° C. followed by curing for 5–6 hours at about 100° C. The second method comprises heating and curing at a temperature ranging between 60° and 130° C. for 24 hours. In the third method, heating is conducted for 30 seconds at a temperature below 100° C., followed by cooling/curing at 40° C.

The second method is more ideally conducted at 70° C./24 hours, while the third method is especially intended for treating a molded resin sheet having a thickness of between 0.3 and 3 mm.

Such heat treatment forces the resin product to contract in the direction in which the internal stress is likely to occur, especially in the direction of extrusion. Longitudinal contraction of about 20 cm (contraction in the width is negligible) can be achieved in a sheet material 200 cm in length when subjected to the heat treatment under the conditions given above.

Such hardening treatment of the resin is effective in precluding deformation which may be caused by residual internal stress and the coarse structure of the resin product A.

The resin product A which has thus been heat treated to contract to prevent warping and twisting due to shrinkage with time or during the subsequent processings is then subjected to sanding or jetting on its surface skin layer X so that the portion beneath the skin layer Y in the drawing where the internal residual stress is relatively small is exposed as the outer surface of the product A.

As is evident from the drawings, the surface layer X is where the resin material 2 concentrates. Because of the aggregate 1 present in the resin product A, the resin material 2 exudes and surfaces to form the skin layer having a highly dense structure. The skin layer is also where the internal residual stress is particularly high because of the uneven structure caused by the uneven flow of the resin at the time of molding or because of the difference in density between the flow direction and the direction perpendicular thereto. Thus, removal of the surface layer X by sanding or jetting is of particular importance as the internal residual stress can be substantially eliminated from the resin product A which has been sufficiently removed of its possibility to deform during the hardening step mentioned above.

The load-deflection temperature of the resin product A is observed to improve to 71.8° C. after the heat treatment as compared to 69.5° C. of the molded products not treated. The sanding or jetting is also found to improve the modulus or rupture as well as the deflection characteristics of the resin product A. That is, the resin product A subjected to sanding or jetting is 629 $kg/cm^2$ in modulus for rupture and deflected at 2.59 kg load whereas the resin product not treated is 554 $kg/cm^2$ in the modulus of rupture and deflected at 2.80 kg load respectively. (Bending test was conducted according to JIS K 7203, using a test sample 25 mm in width and having supporting surface of 7R provided at an interval of 46 mm, loading surfaces of 5R and bending rate of 1 mm/mm. Deflection is expressed by the weight of load at 0.5 mm).

Rolled sand paper is mainly used to grind and remove the surface of the resin product A. Shot peening, grit blasting, sand blasting, etc. are employed as the jetting method. Grit blasting is especially effective in removing the surface skin layer in a short time.

The surface skin layer may be removed entirely or partly from the resin product A depending on the nature or use of the product A to be molded.

The resin product A thus removed of its internal residual stress by removing the surface skin layer may be provided with grooves 3 at this stage to section the resin product A and to thereby block the internal stress in one section from affecting the adjacent sections. This is embodied in the following embodiment to be described.

The resin product A which is eliminated of its internal residual stress by the grooves 3 is then molded (by hot pressing) into a final product such as door and wall as shown in FIG. 5.

An embodiment shown in FIG. 4 will now be described. The resin product A shown in FIG. 4 is removed of its skin layer by the method mentioned above. The surface where the soft aggregate 1 is exposed is provided with scratches 4 using, for example, a sanding roll. The scratches provided in lines in one direction along the resin sheet product A act to give more natural appearance to the product when embossed with a wood-like pattern (to be described later).

The depth of the scratches is not uniform, so that when applied with paint (by means of a brush or sprayer), the painted surface will have uneven shade because of the uneven depth of the scratches, simulating the natural wood pattern.

The resin product A thus processed may be used with or without its surface embossed with a wood-like pattern. It is also possible to mold the product into any arbitrary shape using hot pressing or to combine with any other material. Examples of such use will be described below.

The embodiment shown in FIG. 5 is a resin product A molded by hot pressing and embossed with a wood-grain pattern. In FIG. 6, a resin product A is pasted with a decorative facing sheet B such as decorative veneer or vinyl chloride film and hot pressed. The embodiment shown in FIG. 7 is a plywood C pasted with a resin sheet product A. The embodiment shown in FIG. 8 comprises a soft foamed-synthetic resin D coated with a sheet of resin product A of soft vinyl chloride base, Molded products of synthetic resin according to the present invention having the structure mentioned above are characterized in that:

(1) Any disadvantages caused by warping or twisting of the resin product A are completely eliminated by heat treatment (hardening) and by removing the surface skin layer by sanding or jetting to prevent deformation caused by chronological or thermal changes of the structure (due to chemical changes in the resin material).

(2) Deflection temperature and resistance against deflection can be improved as compared with the conventional synthetic resin molded products by the heat treatment and sanding or jetting treatment.

(3) A wood-like pattern can be embossed on the surface, profiling the die pattern precisely, and the pattern can last over a long period of time without becoming dull or losing its natural appearance. In other words, because the internal residual stress is removed together with the surface skin layer, by sanding or jetting and because the surface containing less resin material 2 is thereby exposed, precise and lasting embossing of the pattern is achieved eliminating the possibility of the resin material restoring its original state. Further, embossing is made easier in the present invention as the skin layer which is dense and hard in structure because of the resin material concentrating therein is removed by such treatment.

(4) The wood-like pattern embossed on the product whose skin layer has been removed by sanding or jetting has a more natural appearance and texture. In other words, since the cellulose aggregate 1 such as wood meal is exposed on the surface of the resin product as the skin layer is removed, giving the appearance and the touch substantially the same as a natural wood plank.

(5) The surface of the resin product sanded or jetted as well as embossed feels like a natural wood as the aggregate 1 mixed in the product is exposed, giving adequate friction and moisture-absorbing property to some extent (sufficient not to become damp) and making it possible to use the product as a substitute of a wood material for its excellent durability and water-resisting property.

(6) In painting the resin product sanded/jetted and embossed, particles of paint adheres firmly on the aggregate surface 1 exposed, preventing the paint from flowing or peeling off and producing precisely painted surface.

(7) The resin product can be bonded with other materials so as to use the same as a plywood as the contraction/expansion, warping and twisting of the resin product are eliminated and whereby the plywood is less likely to warp or twist, preventing the bonded surfaces of the both materials from separating.

What is claimed is:

1. A wood-like molded product of synthetic resin comprising a molded cross-linked thermoplastic resin product of fine cellulose-base aggregate having only the skin layers on top and bottom surfaces of the molded product removed after molding, by first contracting said molded product in longitudinal direction under heat treatment so as to exude the concentrated resin on the skin layers prior to removing the skin layers, the resultant hardened product being free of warping and shrinking.

2. The wood-like molded product of synthetic resin as claimed in claim 1 wherein said surface skin layer is removed by sanding.

3. The wood-like molded product of synthetic resin as claimed in claim 1 wherein said surface skin is removed by jetting.

4. The wood-like molded product of synthetic resin as claimed in claim 1 wherein the surface after the removal of the surface skin layer is embossed with a wood-grain pattern.

5. The wood-like molded product of synthetic resin as claimed in claim 1 wherein the surface after removal of the surface skin layer is provided with grooves to block the internal residual stress.

6. The wood-like molded product of synthetic resin as claimed in claim 1 wherein the surface after the removal of the skin layer forms an adhesion surface to allow other materials to be bonded therewith.

* * * * *